United States Patent
Kim et al.

(10) Patent No.: US 10,217,233 B2
(45) Date of Patent: Feb. 26, 2019

(54) METHOD OF ESTIMATING IMAGE DEPTH USING BIREFRINGENT MEDIUM AND APPARATUS THEREOF

(71) Applicant: KOREA ADVANCED INSTITUTE OF SCIENCE AND TECHNOLOGY, Daejeon (KR)

(72) Inventors: Min Hyuk Kim, Daejeon (KR); Seung-Hwan Baek, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 50 days.

(21) Appl. No.: 15/236,911

(22) Filed: Aug. 15, 2016

(65) Prior Publication Data

US 2018/0005398 A1 Jan. 4, 2018

(30) Foreign Application Priority Data

Jun. 29, 2016 (KR) .................. 10-2016-0081370

(51) Int. Cl.
*G06T 7/514* (2017.01)
*G06T 7/557* (2017.01)
*G02B 5/30* (2006.01)

(52) U.S. Cl.
CPC ............ *G06T 7/514* (2017.01); *G02B 5/3083* (2013.01); *G06T 7/557* (2017.01)

(58) Field of Classification Search
CPC .............................. G06T 7/514; G02B 5/3083
See application file for complete search history.

(56) References Cited

U.S. PATENT DOCUMENTS

| | | | | |
|---|---|---|---|---|
| 3,902,805 A * | 9/1975 | Redner | ................. | G01N 21/23 250/225 |
| 4,179,217 A * | 12/1979 | Robert | ................. | G01N 21/23 250/225 |
| 5,703,726 A * | 12/1997 | Griffith | ................. | G02B 13/04 359/714 |
| 6,081,346 A * | 6/2000 | Terajima | ................. | B41J 2/465 349/196 |
| 6,249,379 B1* | 6/2001 | Denk | ................. | G02B 27/281 359/489.09 |
| 6,271,850 B1* | 8/2001 | Kida | ................. | G06T 15/10 345/419 |
| 7,436,735 B2* | 10/2008 | Garotta | ................. | G01V 1/28 367/38 |
| 7,763,841 B1* | 7/2010 | McEldowney | .... | B29D 11/0073 250/216 |
| 9,020,230 B2* | 4/2015 | Yu | ................. | G06T 11/006 382/131 |
| 9,900,579 B2* | 2/2018 | Takagi | ................. | H04N 5/33 |

(Continued)

FOREIGN PATENT DOCUMENTS

JP   H05087543 A   4/1993
JP   2013097132 A   5/2013

*Primary Examiner* — Jayanti K Patel
*Assistant Examiner* — Irfan Habib
(74) *Attorney, Agent, or Firm* — McCoy Russell LLP

(57) ABSTRACT

Disclosed are a method and a system for estimating an image depth using a birefringent medium. The system for estimating an image depth includes a birefringent medium; and a camera, wherein the camera estimates a depth of a pixel based on an image obtained through the birefringent medium.

15 Claims, 7 Drawing Sheets

(56) References Cited

U.S. PATENT DOCUMENTS

| | | | |
|---|---|---|---|
| 2005/0117117 A1* | 6/2005 | Bourla | A61B 3/1005 351/221 |
| 2006/0215158 A1* | 9/2006 | Saitoh | G01N 21/21 356/364 |
| 2007/0064163 A1* | 3/2007 | Tan | G02B 5/3058 349/5 |
| 2007/0070276 A1* | 3/2007 | Tan | G02B 5/3058 349/117 |
| 2008/0291463 A1* | 11/2008 | Milner | A61B 1/00096 356/491 |
| 2010/0166293 A1* | 7/2010 | Sugita | A61B 3/102 382/154 |
| 2012/0106869 A1* | 5/2012 | Machitani | H04N 5/23254 382/284 |
| 2012/0113092 A1* | 5/2012 | Bar-Zeev | G02B 27/017 345/419 |
| 2012/0127127 A1* | 5/2012 | Large | G06F 3/0425 345/175 |
| 2012/0136259 A1* | 5/2012 | Milner | A61B 1/00096 600/478 |
| 2013/0041226 A1* | 2/2013 | McDowall | A61B 1/00009 600/166 |
| 2013/0258044 A1* | 10/2013 | Betts-Lacroix | H04N 13/0242 334/36 |
| 2014/0176656 A1* | 6/2014 | Omori | G03G 15/04072 347/118 |
| 2015/0049915 A1* | 2/2015 | Ciurea | H04N 13/232 382/106 |
| 2015/0062399 A1* | 3/2015 | Ishihara | G02B 27/646 348/302 |
| 2015/0110347 A1* | 4/2015 | Suzuki | G06K 9/00355 382/103 |
| 2015/0206337 A1* | 7/2015 | Roimela | G06T 7/60 345/419 |
| 2016/0377782 A1* | 12/2016 | Hague | G01J 3/447 359/484.01 |
| 2017/0169596 A1* | 6/2017 | Yonezawa | G06T 7/0012 |
| 2017/0281110 A1* | 10/2017 | Mandelkern | A61B 6/025 |

* cited by examiner

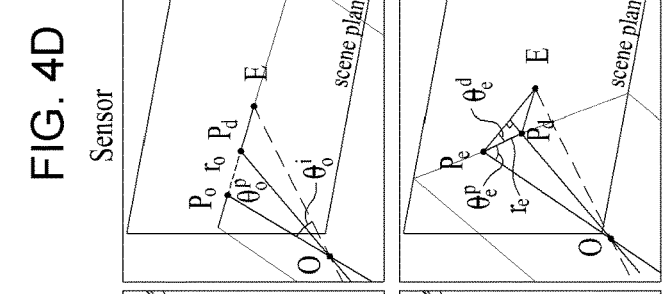
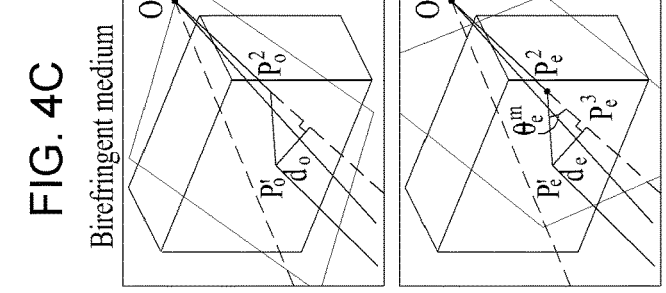
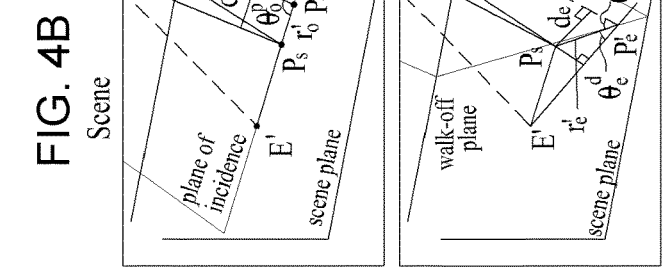
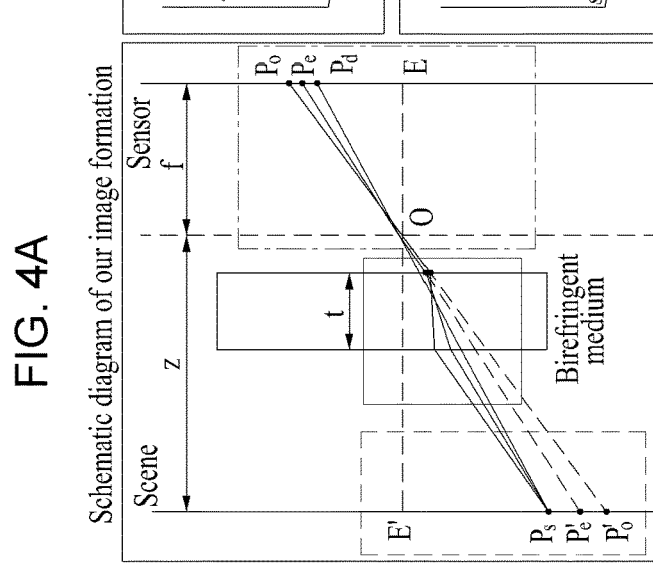
FIG. 4A  FIG. 4B  FIG. 4C  FIG. 4D
FIG. 4E  FIG. 4F  FIG. 4G Separate images Overlapped image

METHOD OF ESTIMATING IMAGE DEPTH USING BIREFRINGENT MEDIUM AND APPARATUS THEREOF

CROSS-REFERENCE TO RELATED APPLICATIONS

A claim for priority under 35 U.S.C. § 119 is made to Korean Patent Application No. 10-2016-0081370 filed Jun. 29, 2016, in the Korean Intellectual Property Office, the entire contents of which are hereby incorporated by reference.

BACKGROUND

Embodiments of the inventive concept described herein relate to a technique for estimating information about an image depth, and more particularly, relate to a method and an apparatus which are capable of estimating information about a depth by installing a birefringent medium such as a birefringent flat plate in front of one camera.

Image depth estimation is very useful for many applications such as computer graphics, robotics, autonomous vehicles, augmented reality, etc. A general stereo or multi-view stereo image technique requires at least two cameras to estimate disparity, so that an additional cost and a large form factor are incurred. Although any other schemes using a single camera have been proposed, those schemes have other drawbacks and require additional hardware which obstructs applications in all scenarios. For example, a scheme is dependent on a structured light and a biprism stereo diminishes a valid sensor resolution by half. The trade-off between a spatial resolution and the number of captured images is one of main limitations of an optical-field depth image.

A reflection based stereo requires a scene imaged through a double-sided half-mirror plate inclined to the right. Depth-from-defocus (DFS) techniques may require shallow depth-of-field to improve depth sensitivity and depth ambiguity may occur due to a low frequency signal. Because previous refraction based stereo techniques require a plurality of input images, the refraction based stereo techniques are suitable to still scenes.

Birefringence is the optical property of anisotropic transmittable material, whereby incident light is split into two rays, that is, ordinary and extraordinary rays, causing the birefringence. Such a phenomenon including information about overlapping of scenes allows a single image to be captured from depth information.

However, there are many problems to be technically solved to estimate a depth from birefringence. First, although several studies are focused on birefringence about a computer graphic simulation, any birefringent image models suitable to a stereoscopic image do not exist. Although geometric relation between a depth and pixel disposal through normal refraction has been studied in the previous refraction stereo, such a model is not suitable for birefringence stereo given with a specific property of extraordinary refraction. The relation between the depth and pixel disposal by birefringence has not been formulated yet. In addition, the previous refraction stereo calibration method for a birefringent material has not been studied. Lastly, the previous refraction stereo finds a pair of images, that is, a direct image and a refracted image corresponding to each other. However, since the birefringence allows two overlapping refracted images to be combined into one image, a new corresponding searching strategy which is capable of processing overlapping information in an image is required.

Therefore, there is a need to provide a method capable of estimating depth information for a birefringent stereo.

SUMMARY

Embodiments of the inventive concept provide a method and an apparatus which are capable of estimating depth information by installing a birefringent medium in front of one camera.

One aspect of embodiments of the inventive concept is directed to provide a system for estimating an image depth which includes: a birefringent medium; and a camera, wherein the camera estimates a depth of a pixel based on an image obtained through the birefringent medium.

The image obtained through the birefringent medium may be obtained through at least one image sensor of the camera in a single optical system.

The camera may divide the obtained image into at least two images and estimate the depth of the pixel based on the at least two images, where the obtained image includes the at least two images which overlap each other.

The camera may generate a birefringent model based on characteristics of the birefringent medium and estimate the depth of the pixel based on the birefringent model and the obtained image.

The camera may select a cost function using a gradient of a pixel included in the obtained image and the birefringent model, and estimate the depth of the pixel based on the selected cost function.

The camera may estimate the depth of the pixel as a minimum value of the selected cost function.

Another aspect of embodiments of the inventive concept is directed to provide a method of estimating an image depth which includes: generating a birefringent model with respect to a relation between a difference between an ordinary ray and an extraordinary ray received through a birefringent medium and a depth; and estimating a depth of a pixel based on an image corresponding to the ordinary ray and an image corresponding to the extraordinary image, wherein the ordinary and extraordinary rays are obtained through at least one image sensor of a camera by using the birefringent model.

The method further includes selecting a cost function by using a gradient of a pixel included in an overlapped image and the birefringent model, wherein the overlapped image may be generated by allowing an image corresponding the ordinary ray to overlap an image corresponding to the extraordinary ray, and the estimating of the pixel depth may be performed based on the selected cost function.

The selecting of the cost function may include: calculating a gradient vector of the overlapped image in first and second directions; generating a map of pixels detected by comparing a magnitude of the calculated gradient vector with a predetermined value; evaluating a first matching cost between the ordinary ray image and the pixels included in the map and a second matching cost between the extraordinary ray image and the pixels included in the map; and selecting one of first and second cost functions based on the first and second matching costs.

The estimating of the depth may be performed by having a depth value which allows the selected cost function to have the minimum value as the pixel depth.

The generating of the birefringent model may include: extracting a disparity function of the ordinary ray according to the depth; extracting a disparity function of the extraordinary ray according to the depth by using a walk-off plane defined by an incident ray and an extraordinary ray output through an optical center previously defined; and generating the birefringent model to which the walk-off plane is applied by combining the extracted two disparity functions with each other.

The method may further include correcting an optical property of the birefringent medium and image setting parameters of the camera, wherein the generating of the birefringent model may be performed by applying the optical property of the birefringent medium and the image setting parameters corrected through the correcting of the optical property and the image setting parameters.

Still another aspect of embodiments of the inventive concept is directed to provide a method of estimating an image depth, which includes: generating a birefringent model with respect to a relation between a difference between an ordinary ray and an extraordinary ray received through a birefringent medium and a depth; and estimating a depth of a pixel included in an overlapped image based on a gradient domain search for the overlapped image, the birefringent model and a cost function of the ordinary and extraordinary rays, wherein the overlapped image is obtained by combining images with each other, and the images correspond to the ordinary and extraordinary rays and are obtained through at least one image sensor of a camera.

Still another aspect of embodiments of the inventive concept is directed to provide an apparatus for estimating an image depth, which includes: a generating unit configured to generate a birefringent model with respect to a relation between a difference between an ordinary ray and an extraordinary ray received through a birefringent medium and a depth; and an estimating unit configured to estimate a depth of a pixel by using the birefringent model based on an image corresponding to the ordinary ray and an image corresponding to the extraordinary image, wherein the images corresponding to the ordinary and extraordinary rays are obtained through at least one image sensor of a camera.

The apparatus may further includes a selecting unit configured to select a cost function by using a gradient of a pixel included in an overlapped image and the birefringent model, wherein the overlapped image may be generated by allowing an image corresponding the ordinary ray to overlap an image corresponding to the extraordinary ray, and the estimating unit may estimate the pixel depth based on the selected cost function.

The images corresponding to the ordinary and extraordinary rays may be obtained through at least one image sensor of the camera in a single optical system.

The selecting unit may calculate a gradient vector of the overlapped image in first and second directions, generate a map of pixels detected by comparing a magnitude of the calculated gradient vector with a predetermined value, evaluate a first matching cost between the ordinary ray image and the pixels included in the map and a second matching cost between the extraordinary ray image and the pixels included in the map, and select one of first and second cost functions based on the first and second matching costs.

The estimating unit may estimate the depth by having a depth value, which allows the selected cost function to have the minimum value, as the pixel depth.

The generating unit may extract a disparity function of the ordinary ray according to the depth, extract a disparity function of the extraordinary ray according to the depth by using a walk-off plane defined by an incident ray and an extraordinary ray output through an optical center previously defined, and generate the birefringent model to which the walk-off plane is applied by combining the extracted two disparity functions with each other.

The apparatus may further include a correcting unit configured to correct an optical property of the birefringent medium and image setting parameters of the camera, wherein the generating unit may generate the birefringent model by applying the optical property of the birefringent medium and the image setting parameters corrected through the correcting unit.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4A illustrates a birefringent image forming model according to an embodiment of the inventive concept;

FIG. 4B illustrates close-up diagram for o-ray light transport at the scene plane;

FIG. 4C illustrates close-up diagram for o-ray light transport at the medium;

FIG. 4D illustrates close-up diagram for o-ray light transport at the sensor plane;

FIG. 4E illustrates close-up diagram for e-ray light transport at the scene plane;

FIG. 4F illustrates close-up diagram for e-ray light transport at the medium;

FIG. 4G illustrates close-up diagram for e-ray light transport at the sensor plane;

DETAILED DESCRIPTION

Figure 1:
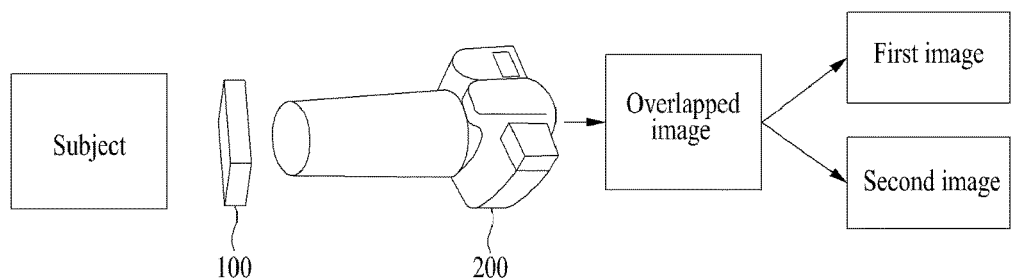
FIG. 1 is a view illustrating the concept of a system for estimating an image depth according to an embodiment of the inventive concept.

Hereinafter, embodiments according to the inventive concept will be described with reference to accompanying drawings, but the inventive concept is not limited thereto. The same reference numerals used in each drawing represent the same elements.

The inventive concept has a technical subject which performs single shot depth estimation after a birefringent medium such as a birefringent plate is installed in front of a camera lens.

The inventive concept has following main features:

(1) In the inventive concept, a birefringent image forming model, which employs a walk-off plane and may illustrate an extraordinary refraction, is formulated. The birefringent image forming model makes a mapping for a possible depth in extraordinary disparity and may implement a single-shot birefringent stereo.

(2) The inventive concept may provide an edge recognition corresponding detection algorithm in a gradient domain and the edge recognition corresponding detection algorithm may determine or confirm a difference in an overlapped birefringent image.

(3) The inventive concept provides a calibration method for a birefringent stereo. The calibration method may determine or confirm an eigendirection of an optical axis in a screen coordinate system as well as a physical direction of a medium.

As compared with the previous method, the inventive concept has an advantage in various applications such as refocusing, stereoscopic generation, automatic object segmentation, depth recognition image editing and the like.

FIG. 1 is a view illustrating the concept of a system for estimating an image depth according to an embodiment of the inventive concept.

As shown in FIG. 1, an image depth estimating system includes a birefringent medium and a camera.

The birefringent medium may be installed at at least one position between a subject and the camera.

In this case, although the birefringent medium is shown to be configured separately from the camera and interposed between a subject and the camera, the embodiment is not limited thereto and the birefringent medium may be integrated with a lens constituting the camera such that the birefringent medium may be interposed between the camera and the subject. Of course, when the birefringent medium is integrated with the lens of the camera, it is preferable to position the birefringent medium in front of the camera lens. Hereinafter, for the purpose of convenient description, the birefringent medium, which is not integrated with the camera lens but separated from the camera lens, will be described.

The camera estimates a pixel depth based on at least one image such as an overlapped image obtained through the birefringent medium.

In this case, as shown in FIG. 1, the camera may obtain the overlapped image and may estimate a pixel depth based on two images which include first and second images after dividing the overlapped image into the first image such as an image by an ordinary ray and the second image such as an image by an extraordinary ray.

The camera may generate a birefringent model in order to estimate the pixel depth based on the overlapped image obtained through the birefringent medium and may estimate the pixel depth based on the birefringent model and the obtained image (that is, the overlapped image). In advance, the camera may select a cost function by using the gradient of a pixel included in the obtained overlapped image and the birefringent model and may estimate the pixel depth based on the selected cost function.

In this case, the camera may estimate the corresponding pixel depth as a value by which the cost function is minimized.

In the camera of the image depth estimating system according to the inventive concept, a process of generating a birefringent model, the contents of the cost function, and the process of estimating the pixel depth by using the birefringent model and the cost function will be described with FIGS. 2 to 6B. The image depth estimating system according to the inventive concept may include all contents described with reference to FIGS. 2 to 6B.

Figure 2:
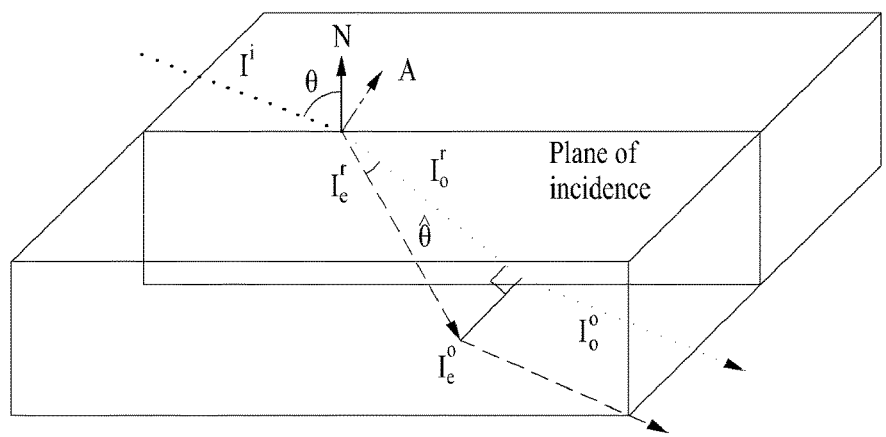
FIG. 2 is a view illustrating birefringence.

FIG. 2 is a view illustrating birefringence. As shown in FIG. 2, when an incident ray $I^i$ arrives on a surface of the birefringent medium, the incident ray $I^i$ is divided into an ordinary ray $I_o^r$ and an extraordinary ray $I_e^r$. The extraordinary ray $I_e^r$ walks off on the incident plane from the ordinary ray by a predetermined angle, so that a birefringence phenomenon occurs.

According to the inventive concept, after the birefringent medium is installed in front of the camera, single-shot depth estimation is performed and will be described in detail.

Differently from a general refraction stereo, the inventive concept may estimate the depth z by utilizing the displacements of the ordinary and extraordinary rays. Thus, the inventive concept may activate the single-shot refraction stereo without the need to directly and additionally capture an image.

The birefringent stereo method according to the inventive concept includes (1) a process of forming an image forming model capable of establishing relation between the difference between ordinary and extraordinary rays and the depth, (2) a method of obtaining depth information from a single image which shows ordinary and extraordinary information while being overlapped, based on a gradient domain search and dual induction (or dual derivation) of matching cost volume, and (3) a calibration method for birefringent material and image setting for obtaining parameters of a corresponding model, and will be described.

Figure 3:
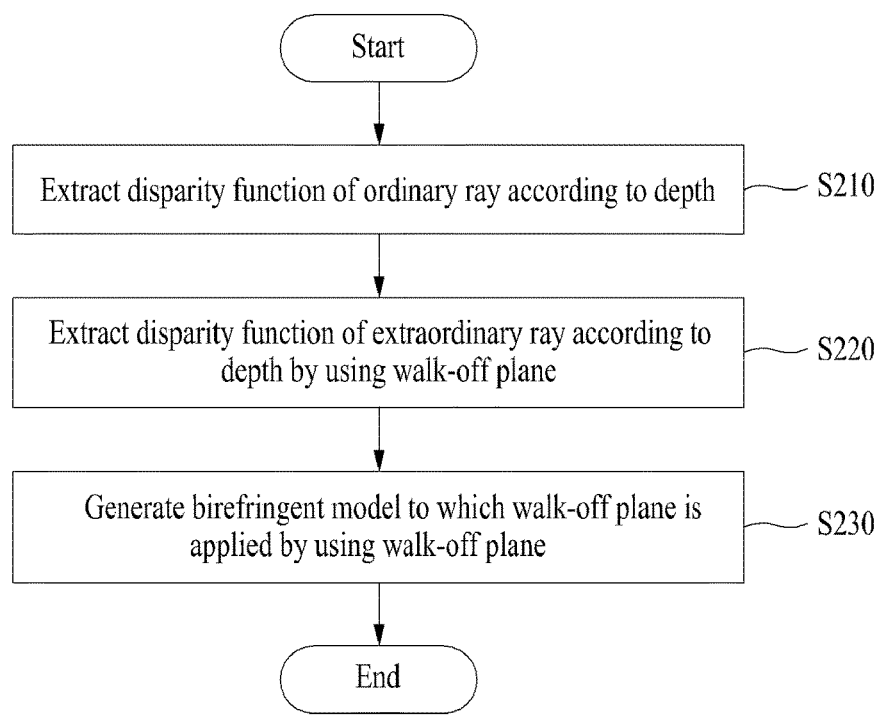
FIG. 3 is a flowchart illustrating the concept of a process of generating a birefringent image forming model.

FIG. 3 is a flowchart illustrating the concept of a process of generating a birefringent image forming model. The birefringent image forming model according to the inventive concept may be generated through the following processes of: extracting a disparity function of the ordinary ray according to the depth (S210); extracting a disparity function of the extraordinary ray according to the depth by using a walk-off plane (S220); and generating the birefringent model to which the walk-off plane is applied by combining the extracted two disparity functions with each other (S230). The birefringent image forming model will be described with reference to FIGS. 4A-G.

1. Birefringent Image Forming Model

FIGS. 4A-G illustrate a birefringent image forming model according to an embodiment of the inventive concept. Table 1 illustrates symbols and signs used in the inventive concept. Table 2 illustrates planes and vectors. Hereinafter, the birefringent image forming model will be described with reference to FIGS. 4A-G.

TABLE 1

| | Symb. | Description |
|---|---|---|
| Common Variables | O | Optical center (pin-hole) of a camera |
| | f | Focal length of a lens |
| | $\eta_o$ | o-ray refractive index of the biref. medium |
| | $\eta_e$ | e-ray refractive index of the biref. medium |
| | a | Optical axis of the biref. medium |
| | n | Normal vector of the plane surface of the biref. medium |
| | t | Thickness of the biref. medium |
| | E | Essential point defined by the biref. medium's normal |
| | E' | Back-projected essential point to the scene plane |
| | $P_s$ | 3D scene point |
| | $P_d$ | Projected pixel position without the biref. medium |
| o-ray | $P_o$ | o-ray pixel position onto the image plane |
| | $P'_o$ | Back-projected point of $P_o$ onto the scene plane |
| | $P_o^1$ | Point where o-ray is at the rear face of the biref. medium |
| | $P_o^2$ | Point where o-ray is at the front face of the biref. medium |
| | $r'_o$ | Distance between $P_s$ and $P'_o$ |
| | $r_o$ | o-disparity; Distance between $P_d$ and $P_o$ |
| | $d_o$ | Walk-off length of o-ray |
| | $\theta_o^P$ | Angle between $\overline{EP_o}$ and $\overline{P_oO}$ |
| | $\theta_o^i$ | Angle between $\overline{P_oO}$ and $\overline{EO}$ |
| e-ray | $P_e$ | e-ray pixel position onto the image plane |
| | $P'_e$ | Back-projected point of $P_e$ onto the scene plane |
| | $P_e^1$ | Point where e-ray is at the rear face of the biref. medium |

TABLE 1-continued

| Symb. | Description |
| --- | --- |
| $P_e^2$ | Point where e-ray is at the front face of the biref. medium |
| $r'_e$ | Distance between $P_s$ and $P'_e$ |
| $r_e$ | e-disparity; Distance between $P_d$ and $P_e$ |
| $d_e$ | Walk-off length of e-ray |
| $\theta_e^p$ | Angle between $\overline{P_d P_e}$ and $\overline{P_e O}$ |
| $\theta_e^i$ | Angle between $\overline{P_e O}$ and $\overline{EO}$ |
| $\theta_e^d$ | Angle between $\overline{P_e E}$ and $\overline{P_e P_d}$ |
| $\theta_e^m$ | Angle between $\overline{P_e^1 P_e^2}$ and $\overline{P_e^2 P_e^3}$ |

TABLE 2

| Plane | Vectors belonging to the plane |
| --- | --- |
| Plane of incidence | $\overline{P_s P_o^1}$, $\overline{P_o^1 P_o^2}$, $\overline{P_o^2 P_o}$, $\overline{P_o P_d}$, $\overline{P'_o P_s}$, $\overline{P_e E}$, $\overline{P'_o O}$, $\overline{P_o O}$, $\overline{P_o E}$, $\overline{OE}$, $d_o$ |
| Walk-off plane | $\overline{P_s P_e^1}$, $\overline{P_e^1 P_e^2}$, $\overline{P_e^2 P_e}$, $\overline{P_e O}$, $\overline{P_e P_d}$, $\overline{P'_e P}$, $\overline{P'_e O}$, $d_e$ |
| Scene plane | $\overline{P'_o P}$, $\overline{P'_e P_s}$ |
| Sensor plane | $\overline{P_e P_d}$, $\overline{P_o P_d}$, $\overline{P_o E}$, $\overline{P_e E}$, $\hat{d}_o$, $\hat{d}_e$, $n_e^p$, $e_e^p$ |

In a model (for example, non-refraction model) according to the related art, a since point Ps is projected onto a point $P_d$ on a sensor through the optical center O of the lens as a solid line. When the refraction medium is disposed in front of the lens, Ps may be projected on a new point Po through the optical center O according to Snell's law as a solid line.

Since Po1 and $P_o^2$ represent first and second cross points and vectors $\overline{P_s P_o^1}$, $\overline{P_o^1 P_o^2}$ and $\overline{P_o^2 P_o}$ are located on the incident plane, the whole ordinary ray remains on the incident plane. If the refraction medium is replaced as the birefringent medium, two rays pass through the optical center O from Ps to arrive at other positions of the sensor. For example, an ordinary ray arrives at Po and an extraordinary ray arrives at Pe as shown as doted lines Since the inventive concept concerns a refracted ray itself propagating through the optical center O, the inventive concept has a feature different from that of a birefringent study of the related art. The model according to the inventive concept includes mutually different input rays $\overline{P_s P_o^1}$ and $\overline{P_s P_e^1}$ instead of the ordinary and extraordinary rays formed from the single incident ray. The inventive concept defines a walk-off plane on which $\overline{P_s P_e^1}$, $\overline{P_e^1 P_e^2}$, and $\overline{P_e^2 P_e}$ are placed. All extraordinary rays remain on the walk-off plane which is important to the model according to the inventive concept, and in this regard, the walk-off plane in extraordinary refraction is similar to an incident plane in ordinary refraction.

Another important feature of the birefringent image forming model according to the inventive concept is an essential point E on a sensor plane. The essential point E may be defined as a point at which a vector n perpendicular to a surface of a refraction medium crosses a sensor plane through the optical center O.

In this case, in a method according to the inventive concept, the vector n is not necessarily required to correspond to the optical axis of a lens.

Thus, the essential point E may be mainly determined by a direction of a transparent medium and may be obtained through calibration described below. The points $P_d$, Po and E are placed on an essential line, but Pe is not placed on the essential line. This feature may cause the corresponding search range to be narrowed.

The inventive concept defines two functions of $\psi_{o \to e}(P_o, z) = P_e$ and $\psi_{e \to o}(P_e, z) = P_o$ concerned with the relation between cross points Po and Pe of the captured ordinary and extraordinary rays. To this end, an additional expression formula for an ordinary ray (or extraordinary ray) representing the relation between Po (or Pe), Pd and z must be extracted. Such a formula may be combined to remove dependence of $P_d$ and may be used to estimate a depth.

In this case, since the single-shot approaching method according to the inventive concept does not require direct capture without any birefringent mediums, $P_d$ cannot be imaged.

To this end, a depth estimating method according to the inventive concept will be briefly described using a difference of an ordinary ray, a well-known technique for two shots, and depth estimating schemes. The inventive concept develops a depth from extraordinary refraction and shows how mutually different pieces of source information representing a birefringent image are combined with each other. The dependence on parameters such as an optical axis for ordinary and extraordinary rays $\eta_o$ and $\eta_e$, a vertical direction n, refraction indexes and the like may be solved after calibration.

(1) Ordinary Ray Difference (or Disparity) According to Depth (S210)

A scene point Ps is projected on Po through the optical center O due to the refraction medium. A distance $r_o = |\overline{P_o P_d}|$ on the sensor plane is a refraction difference (or disparity) dependent on a thickness t of a medium and an index $\eta_o$ of refraction. When it is assumed that a virtual projection of Po through the optical center O on the scene plane is $P_o'$ and any refraction does not exist, and a focus length f is given, a depth z of the point Ps may be estimated as following Equation 1.

$$z = (r'_o / r_o) f \quad \text{[Equation 1]}$$

Wherein, since $r'_o = |\overline{P'_o P_s}|$ may be defined on the scene plane and an ordinary refraction may be processed, $r_o$ and $r_o'$ may be placed on an incident plane. In addition, based on basic trigonometry, $r_o'$ may be expressed as $r_o' = d_o / \sin \theta_o^p$ and $\theta_o^p = \angle(\overline{P'_o O}, \overline{P'_o P_s}) = \angle(\overline{P_o O}, \overline{P_o E})$. The do, which is a lateral displacement of the ordinary ray, may be calculated with a distance between two parallel vectors $\overline{P_o P_o^2}$ and $\overline{P_o^1 P_s}$ and may be expressed as following Equation 2.

$$d_o = \left(1 - \sqrt{\frac{1 - \sin^2 \theta_o^i}{n_o^2 - \sin^2 \theta_o^i}}\right) t \sin \theta_o^i \quad \text{[Equation 2]}$$

Wherein $\theta_o^i$ may be expressed as $\theta_o^i = \angle(\overline{OE}, \overline{OP_o})$.

The Equation 1 defines $r_o$ as the function of the depth z. A function $\psi_{o \to d}$, which is a function of providing mapping between a position Po of a captured ordinary ray and $r_o$, may be expressed as following Equation 3.

$$\psi_{o \to d}(P_o, z) = P_o + r_o(z) \hat{d}_o = P_d \quad \text{[Equation 3]}$$

Wherein $\hat{d}_o$ is a unit vector corresponding to $\overline{P_o E}$ which is defined on an essential line.

Differently from a depth of a refraction stereo algorithm according to the related art, since the inventive concept does not use a direct image, $P_d$ is unknown. Thus, the inventive concept induces or extracts a similarity function $\psi_{e \to d}$ for an extraordinary ray. The inventive concept couples two functions $\psi_{o \to d}$ and $\psi_{e \to d}$ to each other, so that the second capture, that is, the need of a direct capture is removed, thereby achieving a single-shot birefringent stereo.

(2) Extraordinary Ray Difference (or Disparity) According to Depth (S220)

Although an ordinary ray is operated according to Snell's law, an extraordinary ray walks off from an incident plane according to Huygens' Principle and Maxwell's equation. An important concept of the inventive concept is the walk-off plane.

Walk-off plane: A walk-off plane is defined by an incident ray $\overline{P_sP_e^1}$ and an extraordinary ray $\overline{P_e^2P_e}$ output through the optical center O. In addition, vectors $\overline{P_eP_d}$ and $\overline{P_eO}$ on the sensor plane included in the plane is found. Since any direct captures for obtaining $P_d$ do not exist, the inventive concept uses $\overline{P_e^2P_e^1}$ to obtain a normal (or vertical line) to the walk-off plane. When $\overline{P_eO}$ is given, the direction cosine of the extraordinary ray defined as $\overline{P_e^2P_e^1}$ may be obtained through a phase matching scheme using Liang's method.

Depth in extraordinary ray disparity (or difference): Similarly to the ordinary ray disparity for extracting a depth, $r_e=|\overline{P_eP_d}|$ is defined as an extraordinary ray disparity on the sensor plane and the extraordinary ray disparity is dependent on the thickness t of a medium and the index $\eta_e$ of extraordinary refraction. When it is assumed that a virtual projection of Pe through the optical center O on the scene plane is Pe' and any refraction does not exist, the relation between a depth z and an extraordinary ray disparity $r_e$ may be defined from two triangles $\Delta(P_sOP'_e)$ and $\Delta(P_dOP_e)$ on the walk-off plane as following Equation 4.

$$z=(r'_e/r_e)f \qquad \text{[Equation 4]}$$

Wherein $r'_e=|\overline{P'_eP_s}|$ is defined on the scene plane, and $r_e$ and $r_e' \stackrel{.}{=}$ may be placed on the walk-off plane.

By the trigonometric relation, $r_e'$ may be expressed as $r_e'=d_e/\sin\theta_e^P$ and $\theta_e^P$ may be expressed as $\theta_e^P=\angle(\overline{P'_eO}, \overline{P'_eP_s})=\angle(\overline{P_eO},\overline{P_eP_d})$.

In this case, $d_e$ may be a lateral displacement of the extraordinary ray and the lateral displacement of the extraordinary ray may be calculated with a distance between two parallel vectors $\overline{P_eP_e^2}$ and $\overline{P_e^1P_s}$. As shown in FIG. 4F, a triangle $\Delta(P_e^1P_e^2P_e^3)$ is defined and an equation $\theta_e^m=\angle(\overline{P_e^1P_e^2},\overline{P_e^2P_e^3})$ is obtained through a normalized inner product of $\overline{P_e^2P_e^1}$ and $\overline{P_eO}$, so that an equation $d_e=|\overline{P_e^2P_e^1}|\sin\theta_e^m$ may be obtained. As shown in FIGS. 4E and 4F, an angle $\theta_e^P$ may be obtained from the two triangles $\Delta(P_sOP'_e)$ and $\Delta(P_dOP_e)$ on the walk-off plane through the normalized inner product of $\overline{P_eO}$ and $\overline{P_eP_d}$.

When the function $\psi_{e\to d}$ of mapping the positions Pe and $r_e$ of the captured extraordinary ray is defined from the Equation 4, the direct ray position $P_d$ may be expressed as following Equation 5.

$$\psi_{e\to d}(P_e,z)=P_e+r_e(z)\hat{d}_e=P_d \qquad \text{[Equation 5]}$$

Wherein $\hat{d}_e$ may be a unit vector corresponding to $\overline{P_eP_d}$ and may be defined on a crossing line of the walk-off plane and the sensor plane. In addition, $\hat{d}_e$ defines a direction of the extraordinary ray disparity. However, differently from the ordinary ray extraction, since Pe, $P_d$ and E are not commonly arrayed, $\hat{d}_e$ is not defined dependently on an essential point E.

Figure 5:
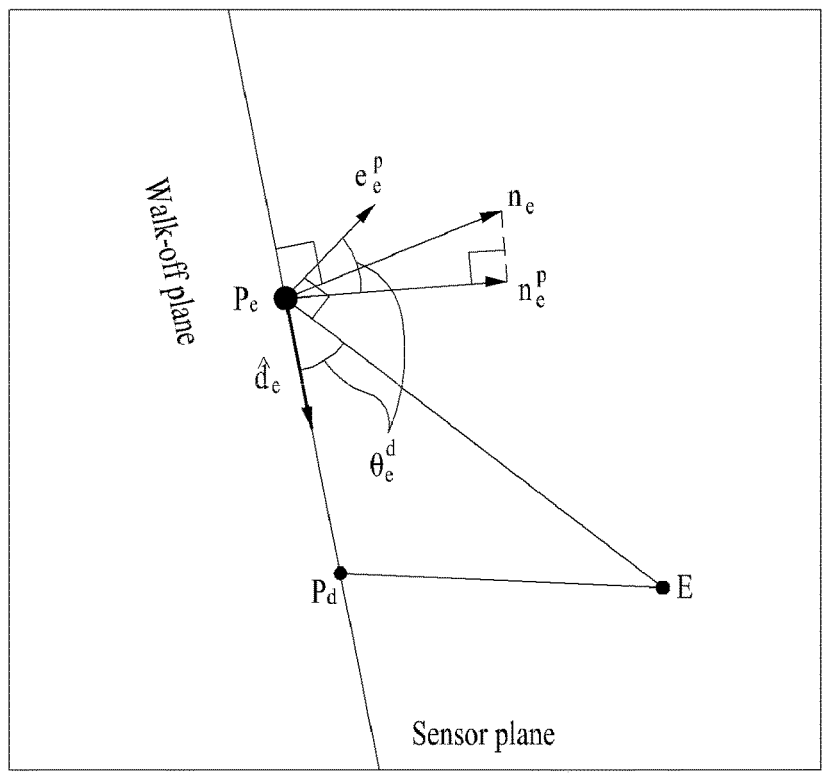
FIG. 5 is a view illustrating the details of FIG. 4G.

Alternatively, as shown in FIG. 5, $\hat{d}_e$ may be obtained through the geometric relation between a vertical line (or normal) $n_e$ of the walk-off plane and $\overline{P_eE}$. First, $n_e^p$ is obtained by projecting $n_e$ on the sensor plane. The unit vector $e_e^p$ perpendicular to $\overline{P_eE}$ on the sensor plane is defined and $\theta_e^d=\angle(\overline{P_eP_d},\overline{P_eE})$ is obtained from the normalized inner product of $n_e^p$ and $e_e^p$.

In this case, the unit vector $\hat{d}_e$ corresponding to $\overline{P_eP_d}$ may be determined by using the obtained angle. In detail, the unit vector $\hat{d}_e$ may be determined by clockwise rotating the normalized vector of $\overline{P_eE}$ based on Pe by an angle $\theta_e^d$ on the sensor plane.

(3) Combining Two Functions (S230)

As described above, although the Equation 3 which is an analytic mapping function defining the relation between the depth z and the ordinary ray disparity and the Equation 5 which is an analytic mapping function defining the relation between the depth z and the extraordinary ray disparity are obtained, since the rays are not captured through a single-shot scheme, the two functions all are dependent on $P_d$.

To remove the dependence, both analytic mapping functions of Equations 3 and 5 are inverted into $\psi_{d\to o}(P_d,z)=P_o$ and $\psi_{d\to e}(P_d,z)=P_e$, and two tables, which store the values of Po and Pe with respect to input parameters $P_d$ and z, are calculated in advance through them. Since both functions have the same parameters, both tables combine into one function which is expressed as a 4-dimensional mapping function $\psi_{d\to o,e}(P_d,z)=(P_o,P_e)$ and may be obtained from two reciprocal functions expressed as following Equation 6.

$$\begin{cases} \psi_{o\to e}(P_o,z)=P_e \\ \psi_{e\to o}(P_e,z)=P_o \end{cases} \qquad \text{[Equation 6]}$$

The corresponding model may be used to calculate the ordinary ray disparity and the extraordinary ray disparity to each depth.

2. Depth According to Birefringent Image

Previous DFS algorithm starts from a group of temporary z candidates and assigns a depth value to each pixel P with respect to given left (x, y) and right (x' and y') views. The relation between the pixel coordinates corresponding to the two views is given by an epipolar line equation x'=x+r (with y'=y).

In this case, the r is a disparity inversely proportional to the depth d.

A cost volume function C (P, z) may be defined by using an epipolar line function and represents how well two pixels are matched with each other. That is, a cost of assigning each depth candidate to each pixel is stored. To improve the performance, an edge recognition filtering process, that is, a cost aggregate is required to all depth slices of the cost volume function C.

Differently from the previous stereo algorithm, there are two big problems when estimating the correspondence in the birefringent image.

The first problem is that, since the ordinary and extraordinary images combine into one, as shown in FIG. 4A, a corresponding pixel has a different color due to overlap. This means that it is impossible to apply the corresponding algorithm based on previously used color similarity. Alternatively, the inventive concept uses a sparse correspondence search in a gradient domain.

The second problem is that there is typical ambiguity of birefringence so that it is difficult to distinguish the ordinary and extraordinary image from each other. The inventive concept may define a cost volume functions Co and Ce per two pixels different from each other with respect to birefringence, and may solve the second problem through a depth candidate search using two mapping functions expressed as Equation 6. This will be described as follows.

Gradient domain search: An overlapped image Y, which is combination of two stereo images, is captured from the ordinary and extraordinary rays Xo and Xe. One image is a displacement version of the other image. According to the inventive concept, a gradient vector ∂Y is calculated in x and y directions and a map Φ made with all pixels P having a gradient magnitude |∂Y(P)|$_2$≥ϵf, wherein l$_2$ represents 12-standard. The detected pixels P∈Φ have a Y-phase corresponding signal. Thus, a depth at Φ is estimated and the result is transferred to all pixels of Y.

Figure 6A:
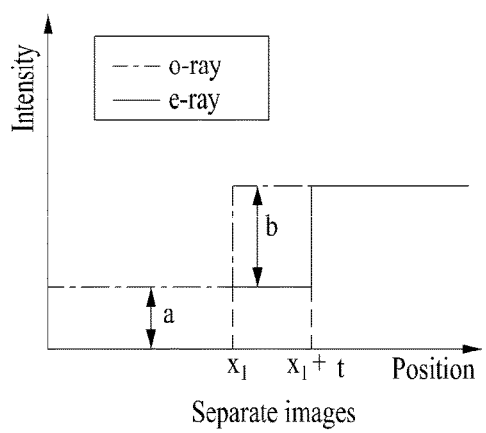
FIG. 6A is a view illustrating intensities of two separated images.
Figure 6B:
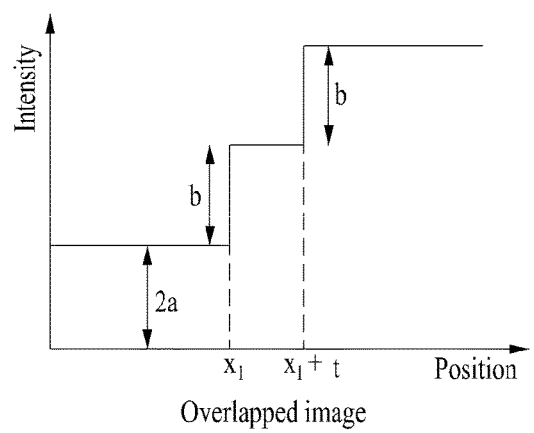
FIG. 6B is a view illustrating an intensity of birefringence of overlapped images.

The gradient ∂Y(P) detected on an edge pixel may be included in Xo or Xe. When P is included in Xo, the corresponding edge pixel must be included in the corresponding pixel Xe. When P is included in Xe, the corresponding edge pixel must be included in Xo. However, when and edge direction corresponds to the disparity direction in the birefringent image, the gradient cannot be assigned to Xo or Xe, so that the images may overlap each other. To enhance the depth estimation, the pixels, the gradient directions of which are near to the disparity direction, may be excluded from Φ. For example, by using various previous schemes and setting the threshold angle of ±45 degrees, an ambiguous gradient may be removed. In addition, the gradient amplitudes of corresponding pixels of birefringence are substantially equal to each other except for the grazing angle on a metal surface. For example, as shown in FIG. 6A illustrating the intensities of two separated images, it is known that the ordinary ray image (dotted line) and the extraordinary ray image (solid line) have the same intensity per a pixel in mutually different images except from the grazing angle on a metal surface. In addition, as shown in FIG. 6B illustrating the intensity of overlapped images of birefringence, it is known that the overlapped images share the same gradient with respect to corresponding pixels.

By comparing the gradient amplitudes with each other, it is possible to test whether give two pixels form a valid corresponding pair. According to the inventive concept, the matching cost function utilizes the specific properties of birefringence to be compared with potential stereo correspondences in the gradient domain.

Dual matching cost volume: It is still clearly unknown whether the pixel edge Φ is included in either the ordinary refraction image Xo or the extraordinary refraction image Xe. Thus, the inventive concept calculates two matching cost functions for all gradient pixels in consideration of two options expressed as following Equation 7.

$$C_o(P,z)=|\partial Y(P)-\partial Y(\psi_{o\rightarrow e}(P,z))|_1$$

$$C_e(P,z)=|\partial Y(P)-\partial Y(\psi_{e\rightarrow o}(P,z))|_1 \quad \text{[Equation 7]}$$

The cost function Co (P, z) evaluates the matching cost of a pixel P in the ordinary ray image with respect to each depth z and searches for the corresponding extraordinary ray disparity by using $\psi_{o\rightarrow e}$. Meanwhile, Ce (P, z) evaluates the matching cost of a pixel P in the extraordinary ray image with respect to each depth z and searches for the corresponding ordinary ray disparity by using $\psi_{e\rightarrow o}$. The matching cost may be obtained by calculating l1-standard of the difference between two gradient vectors.

According to the inventive concept, the refraction property may be clarified by selecting a cost function having the minimum error to all depth candidates.

According to the inventive concept, a channel is divided into R (red), G (green) and B (blue) channels to calculate cost functions and the cost functions of the RGB channels are added up so that the total cost is obtained. Since the matching cost function is an operator per pixel, the matching function estimated in an image may be spared or noised from the essence. To achieve robust performance, in cost volume C (cost aggregation in a previous stereo), an edge-aware filter may be applied to each depth level.

Thus, the most suitable depth estimation for each pixel may be performed by having a depth value, at which the cost volume according to the depth with respect to the corresponding pixel is minimized, as the depth of the corresponding pixel.

When the depth estimation value of each pixel is selected, the selected value is transferred to the remaining image by using Matting Laplacian optimization.

3. Calibration of Birefringence

Since a method of calibrating a birefringent image does not exist, the inventive concept provides a simple and practical method for calibrating a birefringent image. To determine a typical property of a camera such as a projection matrix or a lens distortion coefficient, a camera calibration method according to the related art may be selected. For example, a method based on Zhang's checkboard may be selected.

Hereinafter, a method of calibrating an optical property of a birefringent material such as an essential point as well as an optical axis will be described, where the calibration process is required to be performed only one time.

Essential point: According to the inventive concept, a normal (or vertical line) n of a birefringent medium may point in one direction. The determination (or decision) of the direction of n is the same as that of the position of E on a sensor plane. To this end, the inventive concept uses mutually different three images which includes a non-medium direct image, and two polarizing images having mediums obtained by imaging an ordinary ray (Po point of a sensor) and an extraordinary ray (Pe point of a sensor), as an input of a checkboard.

According to the inventive concept, to exactly identify an ordinary point from an extraordinary point, a previous refraction stereo technique is performed, and the fact that essential lines of an ordinary ray converge upon an essential point E on a sensor plane is utilized. To the contrary, an extraordinary ray does not converge except from specific geometric relation.

Thus, the inventive concept allows a pair of checkboard images to overlap each other and clearly connects the corresponding point to an image including ordinary or extraordinary refraction. In this case, the inventive concept allows a direct image among the images of the checkboard to overlap each image having a refringent medium such that a pair of checkboard images may overlap each other.

Specifically, to estimate the coordinate system of the essential point E, N connecting lines are defined as an implicit function $l_i=\{(x, y)|a_ix+b_iy+c_i=0\}$ and a linear system having N equations is solved by using the minimum square root approximation. The inventive concept estimates the whole variation of essential line convergence and calculates an optimal error with $\Sigma_{i\in\{1\ ...\ N\}}|a_iE_m+b_iE_y-c_i|$, so that the line convergence is measured. In this case, the essential point E may be expressed as $E=[E_x, E_y]^T$ and may be placed on the sensor plane. A smaller error represents an ordinary ray image and the coordinates of the essential point E are sequentially calculated.

Optical axis: A commercial off-the-shelf single-axis crystal is calibrated to provide an optical axis of birefringence. However, in case of a birefringent stereo, there is a need to calibrate the optical axis according to the coordinate system of a camera. The inventive concept provides a calibration method for estimating an optical axis.

The inventive concept uses three checkboard images previously obtained again to correct the essential point E. First, a position of each corner of a direct image, an ordinary ray image and an extraordinary ray image on a checkboard is extracted. When that the positions of pixels corresponding to the corners of each of three images are expressed as $P_d$, Po and Pe, since the essential point E is previously corrected, the depth z may be estimated by using Equation 1 describing the ordinary ray correspondence between $P_d$ and Po.

The optical axis a of birefringent medium may be detected by using $\psi_{e \to d}$ as a parameter to provide the result to $\psi_{e \to d}(P_e, z; a)$. The function may have an unknown variable a and may reconstruct the position of a direct ray from known values Pe and Z. Since the ground truth position $P_d$ of the direct ray is known, the optimal value of a for minimizing an error may be detected.

According to the inventive concept, an optimizing problem may be solved by using a constrained nonlinear minimization solver.

As described above, according to the image depth estimation method of an embodiment of the inventive concept, since the birefringent medium such as a birefringent plate is installed in front of one camera to measure depth information, there is no need to install several cameras as in a stereo system. In addition, a plate having a birefringent property is installed in front of a camera to take a photograph, such that depth information may be estimated from the separated degree of two images formed due to birefringence of the corresponding photograph.

In addition, since the method according to the inventive concept performs single-shot depth estimation in birefringence, the birefringent material is disposed in front of the general camera lens so that the image depth estimation may be easily and simply achieved. Therefore, since the inventive concept is inexpensive, minimizes an effect on a form factor for setting, does not sacrifice a spatial resolution, prevents a visual image from being deteriorated, and allows users to photograph an image without any complex additional hardware and burden of setting, the inventive concept may be useful for personal photographing.

In the description of the method according to an embodiment of the inventive concept, although the birefringent medium is installed in front of a camera, the embodiment is not limited thereto and the birefringent medium may be placed even at any positions between a subject and an image sensor of the camera.

In addition, as described above, the inventive concept may estimate a pixel depth by using two images obtained from a single optical system which commonly uses a camera lens, a barrel and an image sensor.

Figure 7:
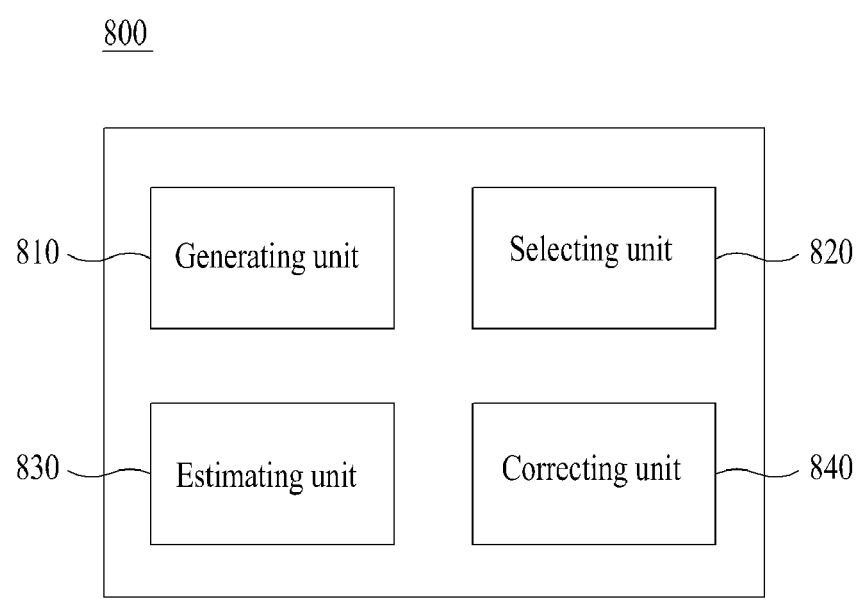
FIG. 7 is a view illustrating a configuration of an apparatus for estimating an image depth according to an embodiment of the inventive concept.

FIG. 7 is a view illustrating a configuration of an apparatus for estimating an image depth according to an embodiment of the inventive concept, wherein the apparatus performs the functions of FIGS. 2 to 6B.

In this case, an apparatus for estimating an image depth according to the inventive concept may be installed to all devices having a camera such as a smart phone, a digital camera and the like.

Referring to FIG. 7, an apparatus 800 according to an embodiment of the inventive concept includes a generating unit 810, a selecting unit 820, an estimating unit 830 and a correcting unit 840.

The generating unit 810 generates a birefringent model with respect to a relation between a difference between an ordinary ray and an extraordinary ray received through a birefringent medium disposed in front of a camera and a depth.

In this case, the generating unit 810 may extract a disparity function of the ordinary ray according to the depth and a disparity function of the extraordinary ray according to the depth by using an incident ray and a walk-off plane defined by the extraordinary ray output through the optical center. The generating unit 810 may combine the extracted two disparity functions with each other to generate the birefringent model to which the walk-off plane is applied.

In addition, the generating unit 810 may generate the birefringent model by applying the optical property of the birefringent medium and the image setting parameters corrected through the correcting unit.

The selecting unit 820 may select a cost function by using a gradient of a pixel included in the overlapped image generated by combining two images of the ordinary and extraordinary rays and the birefringent model.

In this case, the selecting unit 820 may calculate gradient vectors of the overlapped image in first and second directions, for example, x and y directions, generate a map of pixels detected by comparing magnitudes of the calculated gradient vectors with a predetermined value, evaluate a first matching cost between the ordinary ray image and the pixels included in the map and a second matching cost between the extraordinary ray image and the pixels included in the map, and select one of the first and second cost functions based on the first and second matching costs.

In advance, the selecting unit 820 may calculate the first and second matching costs of the predetermined depth candidates with respect to the corresponding pixel and select a cost function corresponding to a matching cost having the minimum error.

The estimating unit 830 estimates a depth of a pixel included in the overlapped image based on the selected cost function.

In this case, the estimating unit 830 may estimate the depth by having a depth value, which allows the cost function selected by the selecting unit 820 to have the minimum value, as the pixel depth.

The correcting unit 840 corrects an optical property of the birefringent medium and image setting parameters of the camera.

In this case, the correcting unit 840 may correct the optical property of the birefringent medium by using a checkboard based method.

Of course, in addition, it should be obvious to those skilled in the art that the apparatus according to an embodiment of the inventive concept can perform all of the functions described with reference to FIGS. 2 to 6B.

The systems or apparatuses described herein may be implemented using hardware components, software components, and/or a combination thereof. For example, the apparatuses and the components described in the embodiments may be implemented using at least one general or special purpose computer, for example, a processor, a controller, an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device to be analyzed or processed by a processing device or to provide a command or data to a processor. The software also may be distributed over network coupled computer systems so that the software is stored and executed in a distributed fashion. The software and data may be stored by one or more computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of some embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware or devices may be configured to act as one or more software modules in order to perform the operations of the above-described embodiments, or vice versa.

It will be apparent to those skilled in the art that various modifications and variations can be made in the inventive concept without departing from the spirit or scope of the inventions. For example, the above-described techniques may be executed in an order different from that described in the description of the inventive concept, and/or the components of the above-described system, structure, equipment (or device), circuit, and so on, may be combined in a format different that of the above-described method according to the inventive concept, and an adequate result may be achieved even if the above-described components of the inventive concept are replaced by any other component or its equivalent.

According to an embodiment of the inventive concept, since the birefringent medium such as a birefringent plate is installed in front of one camera to measure depth information, there is no need to install several cameras as in a stereo system. In addition, a plate having a birefringent property is installed in front of a camera to take a photograph, such that depth information may be estimated from the separated degree of two images formed due to birefringence of the corresponding photograph.

According to an embodiment of the inventive concept, since the method according to the inventive concept performs single-shot depth estimation in birefringence, the birefringent material is disposed in front of the camera lens so that the image depth estimation may be easily and simply achieved. Therefore, since the inventive concept is inexpensive, minimizes an effect on a form factor for setting, does not sacrifice a spatial resolution, prevents a visual image from being deteriorated, and allows users to photograph an image without any complex additional hardware and burden of setting, the inventive concept inventive concept may be useful for personal photographing.

The inventive concept inventive concept may be applicable for various application fields such as virtual reality, an autonomous vehicle and the like by installing a birefringent medium to a previously existing camera.

Thus, it is intended that the inventive concept covers other realizations and other embodiments of this invention provided they come within the scope of the appended claims and their equivalents.

What is claimed is:

1. A system for estimating an image depth, the system comprising:
    a birefringent medium; and
    a camera,
    wherein the camera estimates a depth of a pixel based on an image obtained through the birefringent medium,
    wherein the camera generates a birefringent model based on characteristics of the birefringent medium and estimates the depth of the pixel based on the birefringent model and the obtained image, and
    wherein the camera selects a cost function using a gradient of a selected pixel included in the obtained image and the birefringent model, and estimates the depth of the pixel based on the selected cost function.

2. The system of claim 1, wherein the image obtained through the birefringent medium is obtained through at least one image sensor of the camera in a single optical system.

3. The system of claim 1, wherein the camera divides the obtained image into at least two images and estimates the depth of the pixel based on the at least two images, and the obtained image comprises the at least two images which overlap each other.

4. The system of claim 1, wherein the camera estimates the depth of the pixel as a minimum value of the selected cost function.

5. A method of estimating an image depth, the method comprising:
    generating a birefringent model with respect to a relation between a difference between an ordinary ray and an extraordinary ray received through a birefringent medium and a depth;
    estimating a depth of a pixel based on an image corresponding to the ordinary ray and an image corresponding to the extraordinary ray, wherein the ordinary and extraordinary rays are obtained through at least one image sensor of a camera by using the birefringent model; and
    selecting a cost function by using a gradient of a pixel included in an overlapped image and the birefringent model,
    wherein the overlapped image is generated by allowing the image corresponding the ordinary ray to overlap the image corresponding to the extraordinary ray, and
    wherein the estimating of the pixel depth is performed based on the selected cost function.

6. The method of claim 5, wherein the selecting of the cost function comprises:
    calculating a gradient vector of the overlapped image in first and second directions;
    generating a map of pixels detected by comparing a magnitude of the calculated gradient vector with a predetermined value;

evaluating a first matching cost between the ordinary ray image and the pixels included in the map and a second matching cost between the extraordinary ray image and the pixels included in the map; and selecting one of first and second cost functions based on the first and second matching costs.

7. The method of claim 6, wherein the estimating of the depth is performed by having a depth value which allows the selected cost function to have the minimum value as the pixel depth.

8. The method of claim 5, wherein the generating of the birefringent model comprises:

extracting a disparity function of the ordinary ray according to the depth;

extracting a disparity function of the extraordinary ray according to the depth by using a walk-off plane defined by an incident ray and an extraordinary ray output through an optical center previously defined; and generating the birefringent model to which the walk-off plane is applied by combining the extracted two disparity functions with each other.

9. The method of claim 5, further comprising:

correcting an optical property of the birefringent medium and image setting parameters of the camera, wherein the generating of the birefringent model is performed by applying the optical property of the birefringent medium and the image setting parameters corrected through the correcting of the optical property and the image setting parameters.

10. An apparatus for estimating an image depth, the apparatus comprising:

a processor executing instructions stored on a storage device, the instructions executable by the processor to:

generate a birefringent model with respect to a relation between a difference between an ordinary ray and an extraordinary ray received through a birefringent medium and a depth; and estimate a depth of a pixel by using the birefringent model based on an image corresponding to the ordinary ray and an image corresponding to the extraordinary ray, wherein the images corresponding to the ordinary and extraordinary rays are obtained through at least one image sensor of a camera, wherein the instructions are further executable by the processor to select a cost function by using a gradient of a pixel included in an overlapped image and the birefringent model, wherein the overlapped image is generated by allowing the image corresponding to the ordinary ray to overlap the image corresponding to the extraordinary ray, and wherein the pixel depth is estimated based on the selected cost function.

11. The apparatus of claim 10, wherein the images corresponding to the ordinary and extraordinary rays are obtained through at least one image sensor of the camera in a single optical system.

12. The apparatus of claim 10, wherein the instructions are further executable by the processor to calculate a gradient vector of the overlapped image in first and second directions, generate a map of pixels detected by comparing a magnitude of the calculated gradient vector with a predetermined value, evaluate a first matching cost between the ordinary ray image and the pixels included in the map and a second matching cost between the extraordinary ray image and the pixels included in the map, and select one of first and second cost functions based on first and second matching costs.

13. The apparatus of claim 12, wherein the instructions are further executable by the processor to estimate the depth by having a depth value, which allows the selected cost function to have a minimum value, as the pixel depth.

14. The apparatus of claim 10, wherein the instructions are further executable by the processor to extract a disparity function of the ordinary ray according to the depth, extract a disparity function of the extraordinary ray according to the depth by using a walk-off plane defined by an incident ray and an extraordinary ray output through an optical center previously defined, and generate the birefringent model to which the walk-off plane is applied by combining the extracted two disparity functions with each other.

15. The apparatus of claim 10, wherein the instructions are further executable by the processor to correct an optical property of the birefringent medium and image setting parameters of the camera, and wherein the birefringent model is generated by applying the optical property of the birefringent medium and the image setting parameters corrected through a correcting unit.

* * * * *